(12) United States Patent
Kang et al.

(10) Patent No.: US 9,071,052 B2
(45) Date of Patent: Jun. 30, 2015

(54) UNIT RACK FOR POWER STORAGE AND POWER STORAGE APPARATUS COMPRISING THE SAME

(71) Applicant: LG CHEM, LTD., Seoul (KR)

(72) Inventors: Jung-Soo Kang, Daejeon (KR); Chan-Min Park, Daejeon (KR); Young-Bo Cho, Daejeon (KR); Jong-Soo Ha, Daejeon (KR)

(73) Assignee: LG CHEM, LTD., Seoul (KR)

( * ) Notice: Subject to any disclaimer, the term of this patent is extended or adjusted under 35 U.S.C. 154(b) by 80 days.

(21) Appl. No.: 13/873,491

(22) Filed: Apr. 30, 2013

(65) Prior Publication Data

US 2013/0235499 A1 Sep. 12, 2013

Related U.S. Application Data

(63) Continuation of application No. PCT/KR2012/004261, filed on May 30, 2012.

(30) Foreign Application Priority Data

May 31, 2011 (KR) .......................... 10-2011-0051804
May 30, 2012 (KR) .......................... 10-2012-0057212

(51) Int. Cl.
  *H02H 3/16* (2006.01)
  *H01M 2/34* (2006.01)
  *H01M 2/10* (2006.01)

(52) U.S. Cl.
  CPC . *H02H 3/16* (2013.01); *H01M 2/34* (2013.01); *H01M 2/1016* (2013.01); *H01M 2/1094* (2013.01); *H01M 2220/10* (2013.01)

(58) Field of Classification Search
  USPC ............................ 361/652; 429/158, 159, 162
  See application file for complete search history.

(56) References Cited

U.S. PATENT DOCUMENTS

| | | | |
|---|---|---|---|
| 3,009,035 A * | 11/1961 | Reichert et al. | 337/7 |
| 5,034,620 A | 7/1991 | Cameron | |
| 5,861,794 A * | 1/1999 | Pellon | 337/365 |
| 6,531,938 B1 * | 3/2003 | Smith et al. | 335/14 |
| 8,062,784 B2 * | 11/2011 | Oriet et al. | 429/158 |
| 2006/0172184 A1 | 8/2006 | Hasuda | |
| 2010/0310905 A1 * | 12/2010 | Oriet et al. | 429/1 |

FOREIGN PATENT DOCUMENTS

| | | |
|---|---|---|
| EP | 2 056 375 A1 | 5/2009 |
| JP | 9-153352 A | 6/1997 |
| JP | 11-260344 A | 9/1999 |
| JP | 2006-216342 A | 8/2006 |
| JP | 2011-049014 A | 3/2011 |

OTHER PUBLICATIONS

International Search Report issued in PCT/KR2012/004261, mailed on Nov. 9, 2012, 2 pages.

* cited by examiner

*Primary Examiner* — Robert J Hoffberg
(74) *Attorney, Agent, or Firm* — Birch, Stewart, Kolasch & Birch, LLP

(57) ABSTRACT

Disclosed is a unit rack for power storage having a plurality of cell modules which are series- or parallel-connected with each other; a housing for accommodating the cell modules; a receiving part of a circuit breaker, formed or installed in the housing, and having a ground clearance higher than the highest ground clearance of the cell modules; a circuit breaker received in the receiving part and connected between the connection lines; and a receiving part cover for closing the receiving part of the circuit breaker.

13 Claims, 2 Drawing Sheets

UNIT RACK FOR POWER STORAGE AND POWER STORAGE APPARATUS COMPRISING THE SAME

CROSS-REFERENCE TO RELATED APPLICATION

The present application is a continuation of International Application No. PCT/KR2012/004261 filed on May 30, 2012, which claims priority to Korean Patent Application Nos. 10-2011-0051804 and 10-2012-0057212 filed in the Republic of Korea on May 31, 2011 and May 30, 2012, respectively, the disclosures of which are incorporated herein by reference.

TECHNICAL FIELD

The present invention relates to a unit rack for power storage and a power storage apparatus comprising the same, more specifically to a unit rack for power storage, which has a circuit breaker, and a power storage apparatus comprising the same.

BACKGROUND ART

Power storage apparatuses are generally installed outdoors or in warehouses and basements, and are apt to waterlog when such an installation place floods. The waterlogging of the power storage apparatus may generate a short-circuit current, thereby causing electrocution. Therefore, it is necessary to ensure the safety of the power storage apparatus from waterlogging. For this, a circuit breaker is used to decrease the voltage of the power storage apparatus.

The circuit breaker interrupts an interconnection between cell modules included in the power storage apparatus or an interconnection between cells included in the cell modules, thereby decreasing a voltage detected through the power wires of the power storage apparatus to the voltage level of a cell module unit or cell unit.

DISCLOSURE

Technical Problem

The present invention is designed to solve the problems of the prior art, and therefore it is an object of the present invention to provide a unit rack for power storage, which has a circuit breaker in an optimized position so as to improve the safety of a power storage apparatus and can configure a high-capacity power storage apparatus through a series or parallel connection thereof.

Technical Solution

In order to accomplish the above object, in accordance with one aspect of the present invention, there is provided a unit rack for power storage, comprising a plurality of cell modules which are series- or parallel-connected with each other by connection lines; a housing for accommodating the cell modules; a receiving part of a circuit breaker, formed or installed in the housing, and having a ground clearance higher than the highest ground clearance of the cell modules; a circuit breaker received in the receiving part and connected between the connection lines; and a receiving part cover for closing the receiving part of the circuit breaker.

The cell modules may comprise a plurality of unit cells which are series- or parallel-connected with each other.

The unit cell may be a secondary battery or capacitor being repeatedly charged and discharged.

The housing may be made of metal or plastic.

The receiving part of the circuit breaker may be positioned at the top of the housing.

The receiving part of the circuit breaker may be positioned at the side of the housing.

The receiving part of the circuit breaker may be in the form of a groove which is extended inwardly from the outside of the housing.

The receiving part of the circuit breaker may be in the form of a protrusion which is extended outwardly from the outside of the housing.

The unit rack for power storage may further comprise a gasket for the receiving part cover, interposed between the receiving part of the circuit breaker and the receiving part cover.

The gasket for the receiving part cover may be interposed between the inner side of the receiving part of the circuit breaker and the outer side of the receiving part cover.

The housing is provided with a penetrating hole which connects the inner space of the receiving part with a receiving space for the cell modules, and the connection lines pass through the penetrating hole.

The unit rack for power storage may further comprise a gasket for the penetrating hole, interposed between the inner side of the penetrating hole and the connection lines.

The circuit breaker may comprise at least one selected from a fuse, a mechanical relay and an electronic relay.

The receiving part cover may be provided with a locking member.

In accordance with another aspect of the present invention, there is provided a power storage apparatus comprising the above-mentioned unit rack for power storage in a plurality, wherein the plurality of unit racks are series- or parallel-connected with each other.

Advantageous Effects

In accordance with the present invention, the unit rack for power storage having a circuit breaker installed therein is used in a high-capacity power storage apparatus to decrease the voltage of the power storage apparatus, even if the power storage apparatus is waterlogged as its installation place floods, thereby improving the safety of the power storage apparatus.

Also, in the unit rack of the present invention, the circuit breaker is installed in a position higher than cell modules from the bottom of a housing, and a waterproofing structure is provided in a space where the circuit breaker is installed, thereby effectively preventing the voltage decrease of the unit rack for power storage from being stopped by the waterlogging of the circuit breaker.

DESCRIPTION OF DRAWINGS

The accompanying drawings illustrate preferred embodiments of the present invention and, together with the foregoing disclosure, serve to provide further understanding of the technical spirit of the present disclosure. However, the present disclosure is not to be construed as being limited to the drawings.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the present invention, so it should be understood that other equivalents and modifications could be made thereto without departing from the spirit and scope of the present invention.

Figure 1:
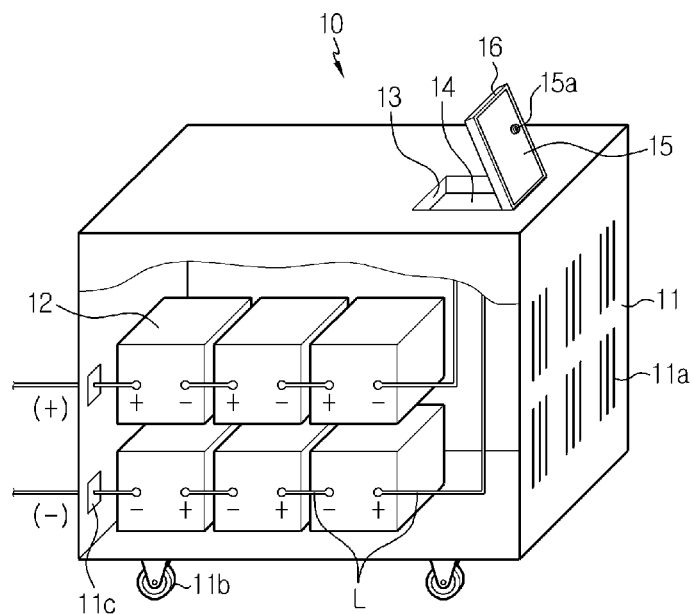
FIG. 1 is a perspective view schematically showing a unit rack for power storage according to one embodiment of the present invention.
Figure 2:
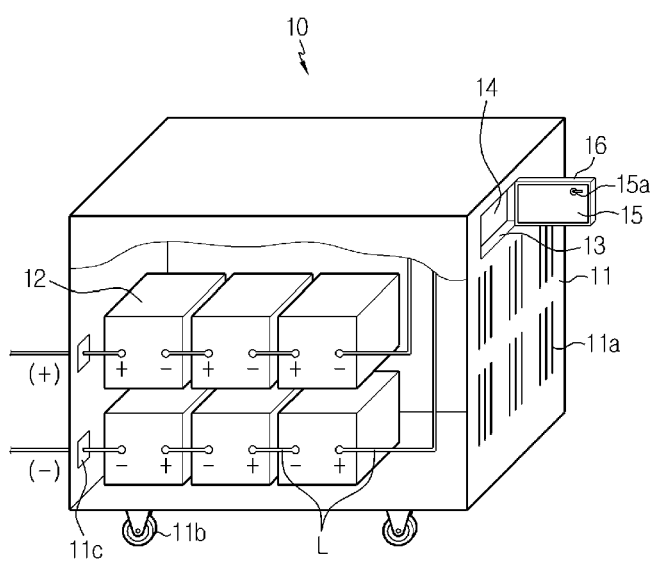
FIG. 2 is a perspective view schematically showing an alternative configuration of the unit rack for power storage shown in FIG. 1, wherein a circuit breaker is installed in a chained position.
Figure 3:
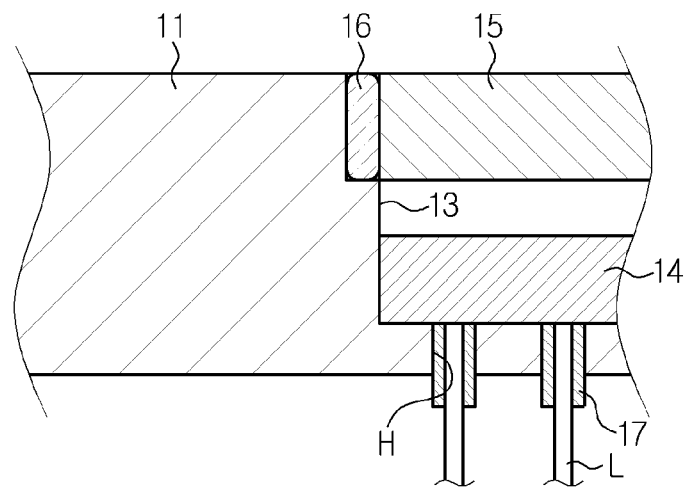
FIG. 3 schematically shows the cross-section of a waterproofing structure part between a receiving part of a circuit breaker and a receiving part cover.

FIG. 1 is a perspective view schematically showing a unit rack for power storage according to one embodiment of the present invention, FIG. 2 is a perspective view schematically showing an alternative configuration of the unit rack for power storage shown in FIG. 1, wherein a circuit breaker is installed in a chained position, and FIG. 3 schematically shows the cross-section of a waterproofing structure part between a receiving part of a circuit breaker and a receiving part cover.

Referring to FIG. 1, a unit rack 10 for power storage according to one embodiment of the present invention comprises a housing 11, a plurality of cell modules 12, a receiving part 13 for a circuit breaker, a circuit breaker 14, a receiving part cover 15 and a waterproofing gasket 16.

The housing 11 receives the plurality of cell modules 12 therein and is made of durable metal or plastic. The housing 11 comprises at least one slit 11a formed on the surface thereof to introduce external air; a moving member 11b, such as a wheel, formed in the bottom thereof to conveniently transport the unit rack 10 for power storage; a connecter 11c functionalized as a passage for connecting the cell modules 12 with an external device (not shown). The external device may be an electronic apparatus which is connected with the unit rack 10 for power storage to be supplied with power, or another unit rack for power storage which is series- or parallel-connected with the unit rack 10 for power storage to configure a high-capacity power storage apparatus.

Each of the plurality of cell modules 12 comprises a high-potential socket (+) and a low-potential socket (−) which may be electrically connected with the other socket having the same or different polarity through a connection line (L). The drawings show that adjacent cell modules are parallel-connected with each other in the housing 11.

The cell modules 12 comprise a plurality of unit cells (not shown) which are series- or parallel-connected with each other therein. The unit cells may be a secondary battery or a high-capacity capacitor being repeatedly charged and discharged, but is not particularly limited to their kinds.

In the array of the cell modules 12, the high-potential socket (+) and the low-potential socket (−) of the outermost cell module are connected with the connecter 11c through the connection line (L). Accordingly, the cell modules 12 may be electrically connected with an external device through the connecter 11c.

The receiving part 13 for the circuit breaker is formed on the top of the housing 11, and is in the form of a groove which is extended inwardly from the outside of the housing 11 to receive the circuit breaker 14. Meanwhile, referring to FIG. 2, the receiving part 13 for the circuit breaker may be positioned in the side of the housing 11.

The circuit breaker 14 is received in the receiving part 13, and may be installed on at least one connection line (L) connecting adjacent cell modules 12. As shown in the drawings, in the case that the unit rack 10 comprises six cell modules 12, the circuit breaker 14 may be installed on a connection line (L) connecting the third and fourth cell modules 12.

In accordance with one aspect of the present invention, the circuit breaker 14 may comprise a fuse. In this case, when over-current flows through the fuse, the circuit breaker 14 irreversibly disconnects the connection line (L) where the circuit breaker 14 is installed through the melting of the fuse.

In accordance with another aspect of the present invention, the circuit breaker 14 may comprise a mechanical relay whose contact points are dissociated by magnetic force when over-current is applied. In this case, when over-current flows, the contact points of the mechanical relay comprised in the circuit breaker 14 are momentarily dissociated to disconnect the connection line (L) where the circuit breaker 14 is installed.

In accordance with another aspect of the present invention, the circuit breaker 14 may comprise a electronic relay whose contact points are dissociated by a controlling signal. In this case, the electronic relay comprised in the circuit breaker 14 is turned off when a controlling signal is input from an external controlling means (not shown) which detects a waterlogging circumstance.

For this procedure, the circuit breaker 14 is preferably connected with the controlling means. The controlling means receives a moisture-detecting signal from a moisture-detecting sensor installed on the surface of the unit rack 10 for power storage, inside thereof or in a position where waterlogging may occur. If a moisture-detecting signal greater than a critical value is input to the controlling means, the controlling means transmits the moisture-detecting signal to the circuit breaker 14 to turn off the electronic relay comprised in the circuit breaker 14, thereby disconnecting the connection line (L) where the circuit breaker 14 is installed. When the connection line (L) where the circuit breaker 14 is installed is disconnected, the voltage of the unit rack 10 for power storage can decrease.

The number of the circuit breaker 14 installed varies depending on a voltage-decrease level desired when the unit rack 10 for power storage is waterlogged. That is, as the voltage-decrease level is lowered, the installation number of the circuit breaker 14 increases.

The receiving part cover 15 has a shape and size corresponding to the opening of the receiving part 13 for the circuit breaker, and functions to close an inner space of the receiving part 13 for the circuit breaker from the outside. The receiving part cover 15 may be made of transparent plastic materials and be provided with a locking member 15a so that only a person in charge may open and close the receiving part cover 15.

Meanwhile, in the drawings of the present invention, the receiving part cover 15 is only shown in the form of a rotating-type, but other types thereof, for example, a detachable cover may be used.

The waterproofing gasket 16 is made of a rubber material and prevents moisture from being infiltrated to the inner space of the receiving part 13 for the circuit breaker. The waterproofing gasket 16 is interposed between the receiving part 13 for the circuit breaker and the receiving part cover 15, specifically the inner side of the receiving part 13 for the circuit breaker and the outer side of the receiving part cover 15, thereby preventing the infiltration of moisture from the upper part of the unit rack 10 for power storage to the inner space of the receiving part 13 for the circuit breaker.

Referring to FIG. 3, the unit rack 10 for power storage may further comprise a secondary gasket 17 interposed between a penetrating hole (H), which connects the inner space of the receiving part of the circuit breaker with a receiving space for the cell modules 12, and a connection line passing through the penetrating hole (H). The secondary gasket 17 prevents the infiltration of moisture from the bottom of the receiving part 13 for the circuit breaker.

Next, a unit rack 20 for power storage according to another embodiment of the present invention will be explained with reference to FIG. 4.

Figure 4:
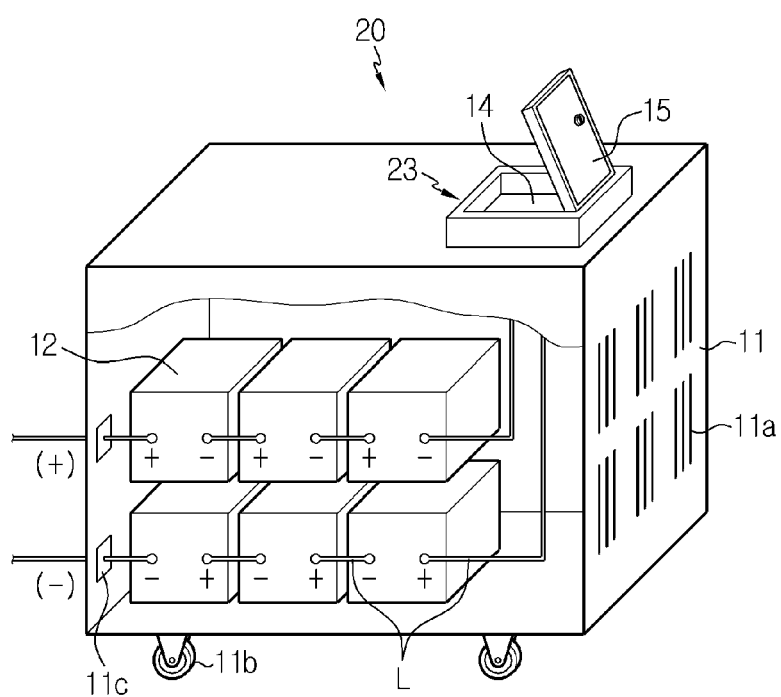
FIG. 4 is a perspective view schematically showing a unit rack for power storage according to another embodiment of the present invention.

FIG. 4 is a perspective view schematically showing a unit rack for power storage according to another embodiment of the present invention.

The unit rack 20 for power storage according to another embodiment of the present invention has the same elements as the above-mentioned unit rack 10 for power storage, except that a receiving part 23 for a circuit breaker has a different structure. Accordingly, the unit rack 20 for power storage will be specifically explained based on the structure of the receiving part 23 for a circuit breaker, while the detailed description of the same elements may be herein omitted.

Referring to FIG. 4, the receiving part 23 for a circuit breaker is in the form of a protrusion which is extended outwardly from the outside of housing 11. In this case, the receiving part 23 for a circuit breaker has a ground clearance higher than that of the receiving part 13 of the unit rack 10 for power storage, thereby allowing the effective protection of the circuit breaker 14 from moisture under a waterlogging circumstance.

Meanwhile, a high-capacity power storage apparatus may be obtained by arraying a unit rack 10, 20 according to the present invention in a plurality and connecting the plurality of unit racks arrayed in series or parallel through a connection line (L).

As mentioned above, even if the power storage apparatus is waterlogged as its installation place floods, the circuit breaker 14 equipped in the unit rack 10, 20 constituting the power storage apparatus can decrease the voltage of the power storage apparatus, thereby improving the safety of the power storage apparatus.

Also, the circuit breaker 14 is installed in a position higher than cell modules 12 from the bottom of the housing 11, and a waterproofing structure is provided in a space where the circuit breaker 14 is installed, thereby effectively preventing the voltage decrease of the unit rack for power storage from being stopped by the waterlogging of the circuit breaker 14.

INDUSTRIAL APPLICABILITY

The present invention has been described in detail with specific embodiments and drawings. However, it should be understood that the specific embodiments and drawings are given by way of illustration only, and thus various modifications and changes may be made by those skilled in the art to the invention which also fall within the scope of the invention as defined as the appended claims.

What is claimed is:

1. A unit rack for power storage, comprising:
   a plurality of cell modules which are series- or parallel-connected with each other by connection lines;
   a housing for accommodating the cell modules;
   a receiving part for a circuit breaker, provided at the housing, and having a ground clearance higher than the highest ground clearance of the cell modules;
   the circuit breaker received in the receiving part and connected between the connection lines; and
   a receiving part cover for closing the receiving part,
   wherein the housing is provided with a penetrating hole which connects the receiving part with a receiving space for the cell modules, and the connection lines pass through the penetrating hole,
   wherein the receiving part has a waterproofing structure, and
   wherein the housing has at least one slit formed on a surface thereof to introduce external air.

2. The unit rack for power storage according to claim 1, wherein the cell modules comprise a plurality of unit cells which are series- or parallel-connected with each other.

3. The unit rack for power storage according to claim 2, wherein each of the unit cells is a secondary battery or capacitor being repeatedly charged and discharged.

4. The unit rack for power storage according to claim 1, wherein the housing is made of metal or plastic.

5. The unit rack for power storage according to claim 1, wherein the receiving part is positioned in a top of the housing.

6. The unit rack for power storage according to claim 1, wherein the receiving part is positioned in a side of the housing.

7. The unit rack for power storage according to claim 1, which further comprises a gasket for the receiving part cover, interposed between the receiving part and the receiving part cover.

8. The unit rack for power storage according to claim 7, wherein the gasket for the receiving part cover is interposed between an inner side of the receiving part and an outer side of the receiving part cover.

9. The unit rack for power storage according to claim 1, further comprising a gasket for the penetrating hole, interposed between an inner side of the penetrating hole and the connection lines.

10. The unit rack for power storage according to claim 1, wherein the circuit breaker comprises at least one selected from a fuse, a mechanical relay and an electronic relay.

11. The unit rack for power storage according to claim 1, wherein the receiving part cover is provided with a locking member.

12. A power storage apparatus comprising the unit rack for power storage according to claim 1 in a plurality, wherein the plurality of unit racks are series- or parallel-connected with each other.

13. A unit rack for power storage, comprising:
   a plurality of cell modules which are electrically connected with each other by connection lines;
   a housing for accommodating the cell modules;
   a receiving part for a circuit breaker, provided at the housing, and having a ground clearance higher than the highest ground clearance of the cell modules;

the circuit breaker received in the receiving part and connected between the connection lines; and a receiving part cover for closing the receiving part, wherein the housing is provided with a penetrating hole which connects the receiving part with a receiving space for the cell modules, and the connection lines pass through the penetrating hole, wherein ends of the connection lines are connected to a bottom surface of the circuit breaker, wherein the receiving part has a waterproofing structure, and wherein the housing has at least one slit formed on a surface thereof to introduce external air.

* * * * *